(No Model.)
F. MINTER.
HEAT REGULATOR FOR INCUBATORS.
No. 505,604. Patented Sept. 26, 1893.
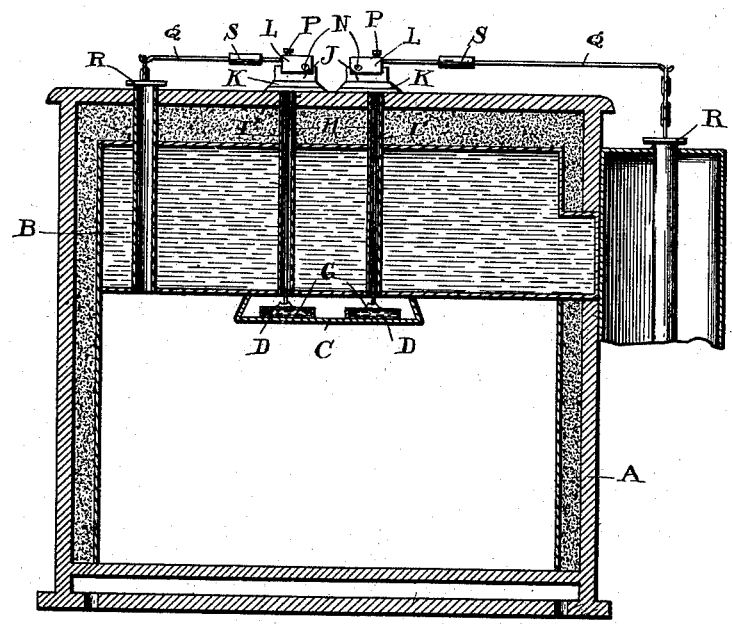
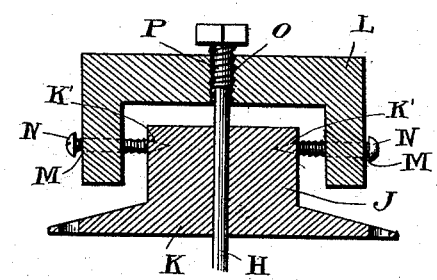
Witnesses
C. A. Ford.
D. P. Wolhaupter
Inventor
Frank Minter.
By his Attorneys,
C. A. Snow & Co.

UNITED STATES PATENT OFFICE.

FRANK MINTER, OF CORNING, KANSAS.

HEAT-REGULATOR FOR INCUBATORS.

SPECIFICATION forming part of Letters Patent No. 505,604, dated September 26, 1893.

Application filed January 31, 1893. Serial No. 460,308. (No model.)

*To all whom it may concern:*

Be it known that I, FRANK MINTER, a citizen of the United States, residing at Corning, in the county of Nemaha and State of Kansas, have invented a new and useful Heat-Regulator for Incubators, of which the following is a specification.

This invention relates to heat regulators for incubators; and it has for its object to provide certain improvements in devices of this character whereby an even temperature can be maintained throughout the incubator.

To this end the main and primary object of the invention is to simplify thermostatic devices, while at the same time to render the same much more susceptible to slight variations in heat or temperature above and below that at which it is desired to maintain in the incubator.

With these and other objects in view which will readily appear as the nature of the invention is better understood, the same consists in the novel construction, combination and arrangement of parts, hereinafter more fully described, illustrated and claimed.

In the accompanying drawings:—Figure 1 is a vertical sectional view of an incubator having a heat regulator connected therewith, said regulator being constructed in accordance with this invention. Fig. 2 is an enlarged detail sectional view of the thermostat. Fig 3 is an enlarged detail sectional view of the pivot or fulcrum of the valve lever.

Referring to the accompanying drawings, A represents an incubator casing in which it is necessary to maintain as even a temperature as possible, and inside of the casing and at the top thereof is arranged an ordinary water tank B, from the bottom of which is suitably suspended a supporting shelf C. On the supporting shelf C, are arranged one or more thermostats D, which, under the influence of the temperature in the casing will accurately regulate and control the degree of such temperature. The thermostat D, comprises companion plates E, of thin metal, preferably of brass, which readily expands and contracts under the influence of the state of the liquid contained between said plates, and also serves as a sensitive conductor for the heat to said liquid. The said thin metallic plates E, are constructed in any suitable shape, and in order to provide for the security of the joint, each of the plates E is provided with the inturned edges F, flatly meeting each other in a liquid tight joint, said edges being designed to be joined hermetically around the entire thermostat after the introduction of a thermostatic liquid G, therebetween.

By reason of disposing the inturned flanged edges F, entirely inside of the space between the plates of the thermostatic container, it must be obvious that the joint will be greatly strengthened against any strain placed thereon by reason of the spreading apart of the plates when the thermostat is operating. Such strain, occasioned by the spreading apart of the plates, is necessarily first placed on the extreme outer edges of the thermostatic container, thereby leaving the greater portion of the joint, which projects within the same, unaffected by the strain, and thereby lessening the possibility of the two plates becoming entirely disconnected from the bulging strain placed thereon, and this is a material point of advantage to note with respect to this construction.

The thermostatic liquid which is employed is preferably a mixture of stronger ether and bi-sulphide of carbon, or may be any other suitable liquid of the highly volatile liquid of the carbon series. The stronger ether boils at a temperature of about 98° Fahrenheit, and the bi-sulphide of carbon at a temperature of about 110° to 118° Fahrenheit. Therefore when these two liquids are mixed together in any suitable proportion, a highly efficient thermostatic liquid is the result, the boiling point of which liquid can be varied by the proportions of the mixture. For example, a mixture of one-third of the stronger ether to two-thirds of the bi-sulphide of carbon gives a mixture having a boiling temperature of about 103° Fahrenheit, which is the best possible temperature at which an incubator should be maintained. According to the altitude of the place at which the incubator is located, the proportions of the two liquids could of course be varied. Ethyl bromide having a boiling point of about 106° Fahrenheit, or common sulphuric ether having a boiling point ranging from 94° to 96° Fahrenheit, are liquids which could be adapted for this purpose.

Now it will be seen that, with the mixture of ether and bi-sulphide of carbon between the thermostat plates, a rise of the temperature in the incubator above 103° would cause the liquid to boil, so as to cause the thin metal plate to spread out, and in order to take advantage of this expansion I employ a vertical regulating rod H, the lower end of which loosely rests in the upper concaved face of the button I, soldered to the center of the thermostat. The vertical regulating rod H, passes through the inclosing tube I', and the top of the incubator, above which the said rod projects through the perforated pivot or fulcrum block J.

The centrally perforated pivot or fulcrum block J, has a flanged base K, secured to the top of the incubator casing, and is further provided on the sides thereof with the conical bearing recesses K'. The block J, is embraced by the U-shaped lever yoke L, the depending arms of which are provided with threaded perforations M, to receive the pointed bearing screws N, passing therethrough and bearing in said recesses K'. The said yoke L, is further provided in the top thereof with the threaded perforation O, to receive the regulating screw P, against the lower end of which bears the upper end of the regulating rod H. A valve lever Q, is extended from the yoke L, and carries at one end a valve R, adapted to work over a suitably arranged heat escape opening of the incubator casing, or the heater therefor. A sliding weight S, is mounted on the lever Q, so as to retard or ease the expansion of the thermostat, while the screw P, regulates the movement of the valve lever.

It is of course understood that several of the thermostats and the valve mechanism may be employed, in connection with an incubator and the heater therefor.

Having thus described my invention, what I claim, and desire to secure by Letters Patent, is—

1. A thermostat comprising thin metallic plates hermetically sealed at their edges and containing a thermostatic liquid composed of stronger ether and bi-sulphide of carbon, substantaially as set forth.

2. In a thermostatic regulator, the combination with an incubator; of a centrally perforated pivot or fulcrum block secured to the top of the incubator and having conical bearing recesses in opposite sides thereof, the valve lever having a U-shaped yoke at one end, said yoke having a threaded perforation in the top and the depending arms of which are provided with threaded perforations, pointed bearing screws engaging said threaded perforations and bearing in said bearing recesses, a liquid-controlled thermostat arranged within the incubator and having a concaved button on the top thereof, a regulating rod having its lower end resting in said button, and a regulating screw engaging the top perforation of said lever yoke and working over the upper end of said regulating rod, substantially as set forth.

In testimony that I claim the foregoing as my own I have hereto affixed my signature in the presence of two witnesses.

FRANK MINTER.

Witnesses:
C. C. SINING,
FRED E. JOHNSON.